Patented July 2, 1946

2,402,959

UNITED STATES PATENT OFFICE 2,402,959

REMOVAL OF BORON FROM BORON POLLUTED SUBSTANCES

Hilding B. Gustafson, Hinsdale, and Edward Kominek, Jr., Chicago, Ill., assignors to Infilco Incorporated, Chicago, Ill., a corporation of Delaware No Drawing. Application May 13, 1943, Serial No. 486,914

8 Claims. (Cl. 23—91)

This invention relates to the removal of boron or boron compounds from other materials.

A general object of this invention is the removal of boron from salts.

Another object of this invention is to separate boron or boron compounds from aqueous solutions of salts.

A specific object of this invention is the removal of boron or boron compounds from brine.

Another specific object of this invention is the removal of boron from magnesium containing brines.

A further object of the invention is to provide a process whereby boron may be removed rapidly and economically from boron polluted solutions, such as brine.

Other objects of the invention will be apparent from the specification and claims which follow.

Boron, probably present in the form of borates, is often found in admixture with other salts or in brines and is present in sea water and even in fresh waters. Sometimes, as in the manufacture of magnesium from magnesium containing brine, even a small quantity of boron causes trouble in the process or remains as an impurity in the finished product. In the manufacture of metallic magnesium from sea water, for example, the magnesium is commonly first precipitated as magnesium hydroxide or hydrate by the addition of lime. The magnesium hydroxide is then reacted with hydrochloric acid to form magnesium chloride and finally the metallic magnesium is separated by treatment in an electrolytic cell. In the treatment of well brines which are rich in magnesium chloride, the precipitation with lime and subsequent preparation of magnesium chloride can be eliminated, it being necessary only to concentrate the brine and separate in the electrolytic cell. In either process, and through all the steps, the boron goes with the magnesium, so that practically the entire boron content of the original brine is found in the magnesium chloride in the electrolytic cell. When boron is present in the final step in which metallic magnesium is separated from its compounds in the molten bath of the electrolytic cell, difficulties arise and operating cost is increased. Hitherto no satisfactory way of removing the boron from the magnesium in the preliminary step has been known. We have discovered that the boron impurities in such salts or brines can be quickly and cheaply removed in a manner which does not require the supervision of an expert chemist, as is usually needed in prior processes. We have found that boron removal can be effected by contacting the boron contaminated solution with certain porous bodies and that these bodies can be cheaply regenerated for further use. Briefly, our invention comprises the passing of an aqueous solution of the boron contaminated salts or the natural brines in contact with particles of one or more of the materials hereinafter referred to and preferably contact is had by flowing the solution through a bed of the material prepared in granular form. We have found that the power to adsorb or take up boron from such solutions is possessed by compounds of the metals iron, chromium, nickel, magnesium, and aluminum. To be useful for our purpose the material must be prepared in the form of porous particles and the compound must be a hydrated one and must be relatively insoluble both in a weak caustic solution and in a weak acid solution. The boron adsorbing capacity varies with the different elements and also for each element with the particular compound used, its porosity, hydration, particle size, etc. The boron adsorbing power is not limited to insoluble compounds of these elements. In fact the reverse is to some extent true and the degree of insolubility required is only that imposed by the necessity of avoiding too rapid wasting or deterioration of the bed. Examples of suitable compounds are the oxides, hydroxides, silicates and phosphates. Ferric hydrate prepared in gel form and dried to stability is a preferred material for several reasons such as cost and durability, although it does not have as great boron adsorbing power as some of the other compounds. We have further discovered that such materials can be regenerated repeatedly and some of them indefinitely by a dilute caustic solution and that the caustic can be washed out with water. As these materials tend to hold some of the caustic rather tenaciously we prefer either immediately or after a preliminary water wash to wash with a weak acid solution. Although other acids may be used we prefer to use carbonic acid which may be done by passing carbon dioxide through the bed followed by a flow of water, or rinsing the bed with a carbonated water.

We have found that boron can be removed from such brines or solutions by contacting them with certain bodies or types of bodies hereinafter referred to. It is not clear to us as yet whether the action is purely one of adsorption or whether there is some chemical action or whether both may be involved. While we found a considerable number of substances that possessed the power to take up boron to some extent only a limited number of these possessed the power to an extent to be commercially useful. Some while having sufficient adsorption power for boron were relatively expensive or presented other difficulties. While it appears that the phenomena of boron removal is at least partly one of adsorption, most common adsorbents do not have the capacity for selectively removing boron from solutions to a degree necessary for commercial operation. We found that all bodies that possessed appreciable boron adsorbing power and particularly those that are commercially useful possessed certain characteristics. They are highly porous, are hydrated to a greater or lesser degree, and tend to hold caustic soda so that it is not readily removed by simple washing with water. In addition to these properties, those materials that are commercially useful are quite insoluble in water, brines, weak alkali solutions and weak acid solutions. However, we were unable to directly relate the boron adsorption capacity to any of these properties, although for any particular substance removal is in proportion to the porosity of the substance. It is a definite property of some elements, such as iron, in the sense that all compounds of iron that were prepared in porous form and that were insoluble in weak caustic soda and acid solution had the property to a good extent. The same appears to be true of chromium.

We have discovered that when a boron contaminated solution or brine is passed through a bed of the above mentioned materials, the boron is selectively removed from the solution. We have also discovered that best commercial results are secured by a gel-like and hydrated iron oxide. Very good results are also secured from using chromium or aluminum gel or gel-like substances. However, the former is quite expensive and the latter tends to be too soluble even in weak acid or caustic to be generally useful.

The use of some of the materials mentioned will be shown in the following examples, in which a natural magnesium chloride brine contaminated with boron to the extent of 86 parts per million, commonly designated as p. p. m., was passed through the mentioned material with the results shown.

*Example 1*

An iron gel was prepared by dissolving 100 grams of commercial anhydrous ferric sulphate in water to form 500 cc. of solution. The solution of ferric sulphate was mixed with an equal quantity (500 cc.) of caustic soda which contained 70 grams of technical sodium hydroxide, the mixture being stirred until the precipitate formed a smooth and thick slurry. The slurry was filtered, the precipitate was pressed into the form of a cake, dried at a temperature of about 120 degrees Fahrenheit, thoroughly washed, ground and screened.

A bed of 75 cc. of the iron gel, 20 to 50 mesh in size, was prepared. Although this material had boron removing capacity at this point, the bed was regenerated with 100 cc. of 2% sodium hydroxide solution using a 10 minute period for the regeneration in order to have the bed uniformly treated for all runs. The bed was then washed with 500 cc. of carbonated water and was finally washed for 30 minutes with water, being the time required to decrease the M alkalinity to approximately 155 parts per million. The raw magnesium chloride brine containing 86 parts per million of boron was passed through this bed at a flow rate of 16 cc. per minute until 1 liter of raw brine had passed through the bed.

The effluent from the bed (1 liter) was tested quantitatively for boron and it was found that the boron content was 41 parts per million, a reduction of more than half.

The bed was then regenerated as in the first instance, with a 2% solution of sodium hydroxide followed by a short wash of water to remove the alkali solution from the bed, then with carbonated water and finally with a small quantity of water and the runs again repeated. It was found that the iron gel operated to successfully remove boron for an indefinite number of times without measurable loss of the bed material and with results averaging a reduction to about 40 parts per million.

*Example 2*

The magnesium brine used in Example 1 was passed through a series of four beds of iron gel as above mentioned. The beds were of the same size and the flow was at the same rate, the effluent from each of the beds being tested quantitatively to determine the boron therein. It was found that the effluent from each bed contained roughly one-half of the boron contained in the influent to that bed. Thus, in passing through four beds the amount of boron removed rose from 50% of the original amount to about 92% after the fourth pass. This indicates that, within certain limits, the percentage of removal decreases in a geometrical regression in proportion to the depth of the bed.

*Example 3*

A chromium gel consisting primarily of hydrated $Cr_2O_3$, was prepared in a manner similar to the preparation of the iron gel above mentioned and was tested in the same manner as described in Example 1. The effluent contained 27 parts per million of boron. As in the other example, the gel was regenerated by caustic solution and washed with carbonated water.

*Example 4*

An aluminum gel consisting primarily of hydrated $Al_2O_3$ was prepared by a method similar to that described in Example 1, except that an excess of ammonium hydroxide was used instead of caustic soda. This material was tested in the same manner as the iron gel. It was found that the effluent contained only 26 parts per million of boron. However, it was found that while the capacity of the gel could be regenerated by caustic soda, there was a tendency for the gel to dissolve in the regenerating solution. While this gel gave the best results of any, its solubility in caustic soda makes it less feasible economically than the iron gel.

Many other materials, including other metallic oxide gels, were tested. Best results were secured by the metallic hydroxides which were, however, sometimes mixed with other compounds in order to get porous and insoluble bodies. In a sense it could be said that the hydroxides must sometimes be held together by a binder such as a silicate or phosphate, or other insolubilizing agent. As indicated, with each element or material mentioned the capacity is proportional to its porosity, best results being secured by materials with a large amount of ultra-microscopic pores. The capacity also varies with different compounds of the same metal. For example, alumina in a granular and insoluble form did not have the boron removal capacity of the aluminum gel. It was also found that many materials with high general adsorptive powers proved unsatisfactory.

A further series of tests was run to determine the effect of the temperature upon boron removal. It was discovered that raising the temperature generally increased the efficiency of boron removal capacity of the material. For example, an iron gel which reduced the boron concentration of the magnesium brine to 40 parts per million at room temperature (75 degrees Fahrenheit) showed a somewhat greater reduction when the temperature was 140 degrees Fahrenheit, giving a reduction to 35 parts per million.

It was discovered also that the capacity of material to remove boron, after exhaustion, could be regenerated by washing the bed with caustic soda (sodium hydroxide), or other alkaline or alkaline reacting solutions, such as, for example, sodium carbonate, sodium metasilicate, tri-sodium phosphate, and the like. It was found, however, that such regeneration required a very extensive amount of rinsing to remove the caustic from the bed sufficient to restore the boron removal capacity when water alone was used for rinsing. However, if carbon dioxide were passed through the bed during rinsing, or if rinsing was done by a carbonated water, the amount of rinse water required was very greatly reduced and the capacity of the material to remove boron was completely restored. This effect can also be secured by washing with a weak acid or acid reacting solutions such as acetic acid, mono-sodium phosphate, sodium acid, sulfite and the like. Effort was made to regenerate the materials with acid rather than alkali, particularly the materials which were not soluble in dilute acid, but it was found that regeneration was not as complete as with caustic and that the capacity of the bed to remove boron was therefore gradually reduced. Best results were secured with chromium gel and aluminum gel. Iron gel has a good adsorption capacity but not as great as the two mentioned, but it is inexpensive and insoluble, while chromium gel is more expensive than an amount of iron gel sufficient to secure similar removal, and aluminum gel has a tendency to dissolve in the regenerating solution. It was also found that an iron silicate gel had considerable boron removing capacity, more in fact in proportion to the amount of iron present than any of the iron hydroxide gels, although not as much per unit of volume.

The term "brine" as used herein designates natural or other solutions of salts. The term "insoluble" as applied to boron adsorbing materials, indicates that such materials are insoluble or only slightly or very slowly soluble in water, brine, weak acid solutions and weak caustic solutions. The term "boron" will be understood to include the compounds of boron as well. The term "dried," used in referring to the metallic compound used as an adsorbent, will be understood to mean that these compounds have been dehydrated from the hydrogel to what is commonly known as the "dried" state—which drying effects an irreversible removal of water of hydration of the original compound. The term does not indicate that the material is dry at the time of use, for it will be immersed in the solution from which boron is to be removed, and will not be dried between cycles.

Manifestly many variations and modifications of the invention hereinbefore set forth may be made by a person skilled in the art without departing from the spirit and scope hereof. Accordingly the appended claims should be given an interpretation commensurate with the novelty herein described and as broad as may be permitted by the prior art.

We claim:

1. A cyclic process for removing a boron containing compound from brine which comprises contacting said brine with a dried and granular material taken from the class consisting of the oxides, hydroxides, silicates and phosphates of iron, chromium, nickel, magnesium and aluminum, said material being substantially insoluble in said brine, separating said brine from said material; then regenerating said material by contacting it with a dilute solution of caustic; and again passing further quantities of said solution through said material.

2. A process for removing a boron salt from a brine contaminated therewith which comprises contacting said brine with an insoluble, porous and granular compound taken from the class consisting of the oxides, hydroxides, silicates and phosphates of iron, separating said brine from said material, regenerating said material by contacting the same with an alkali, and contacting additional brine with said material.

3. A process for removing a boron salt from a brine contaminated therewith which comprises contacting said brine with an insoluble, porous and granular compound taken from the class consisting of the oxides, hydroxides, silicates and phosphates of chromium, separating said brine from said material, thereafter contacting the material with a solution of an alkali, and thereafter contacting additional brine with said material.

4. A process for removing a boron salt from a brine contaminated therewith which comprises contacting said brine with a porous, insoluble and granular compound taken from the class consisting of the oxides, hydroxides, silicates and phosphates of nickel, separating said brine from said material, treating said material with a solution of an alkali to regenerate its removal capacity, and thereafter contacting additional brine with said material.

5. A cyclic process for removing a boron salt from brine contaminated therewith comprising passing said boron contaminated brine through a bed containing a material taken from the class consisting of oxides, hydroxides, silicates and phosphates of iron, nickel, chromium, magnesium and aluminum, regenerating said bed by first contacting it with a dilute solution of caustic, washing the bed with water and then with water containing carbon dioxide, and again passing boron containing brine through said bed.

6. A process of separating a boron compound from a mineral salt solution contaminated therewith which comprises passing such solution through a bed containing a member of the group consisting of the oxides, hydroxides, silicates and phosphates of iron, chromium, nickel, magnesium and aluminum in the form of insoluble, highly porous granules, until the effluent contains not over a permissible maximum of boron compound; thereafter passing a caustic regenerating solution through the bed, whereby the boron compound is removed therefrom; washing the so regenerated bed with water and carbon dioxide; and subsequently again passing contaminated solution therethrough.

7. A cyclic process of removing a boron salt from a solution containing a salt of magnesium that comprises contacting the solution with a material containing in insoluble form a member of the group consisting of a compound of iron, chromium, nickel, magnesium and aluminum, said material being in the form of particles containing ultra microscopic pores, separating said solution from said material, regenerating the material by contacting the same with a solution of a strongly alkaline material, washing the material with water to remove excess alkali, and treating additional quantities of said brine with said material.

8. A cyclic process for removing a boron compound from a solution containing a salt of magnesium comprising the steps of flowing the solution through a bed containing in insoluble form one or more members of the group consisting of a compound of iron, chromium, nickel, magnesium and aluminum in the form of highly porous granules, whereby the boron compound is separated from the solution and retained in the bed, regenerating the bed by passing therethrough a solution of a strongly alkaline material, washing the bed with a solution of a weak acid, and again passing boron containing solution therethrough.

HILDING B. GUSTAFSON.
EDWARD KOMINEK, Jr.